July 19, 1966  S. I. NILSSON  3,261,484
STRUCTURE FOR HANDLING FOOD
Filed Feb. 21, 1964  3 Sheets-Sheet 1
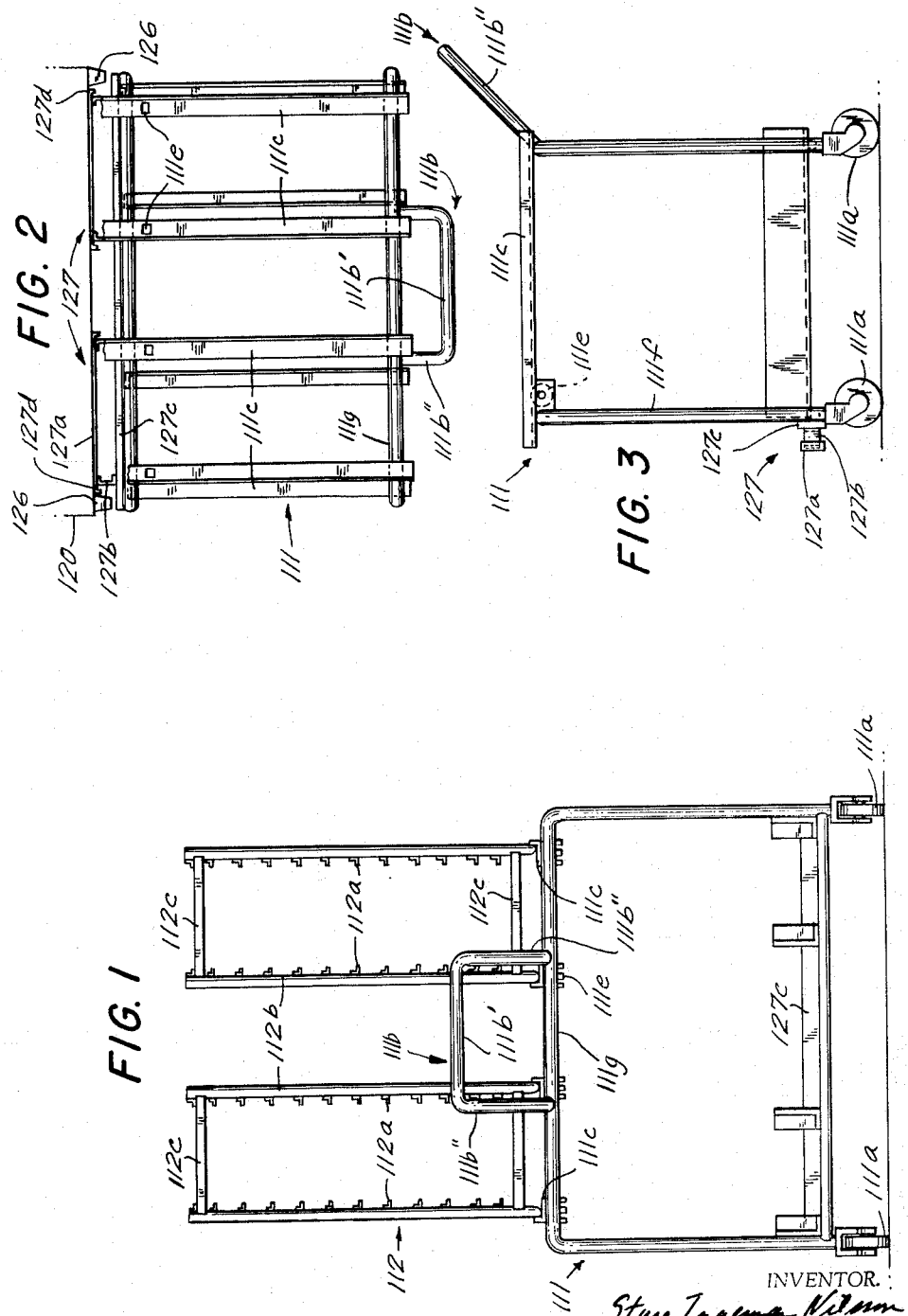
INVENTOR.
Sture Ingemar Nilsson
BY
his ATTORNEY July 19, 1966 S. I. NILSSON 3,261,484
STRUCTURE FOR HANDLING FOOD
Filed Feb. 21, 1964 3 Sheets-Sheet 2
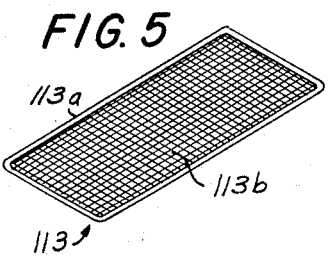
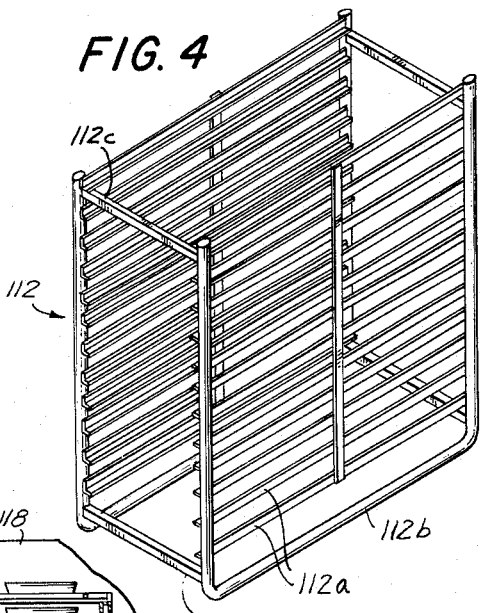
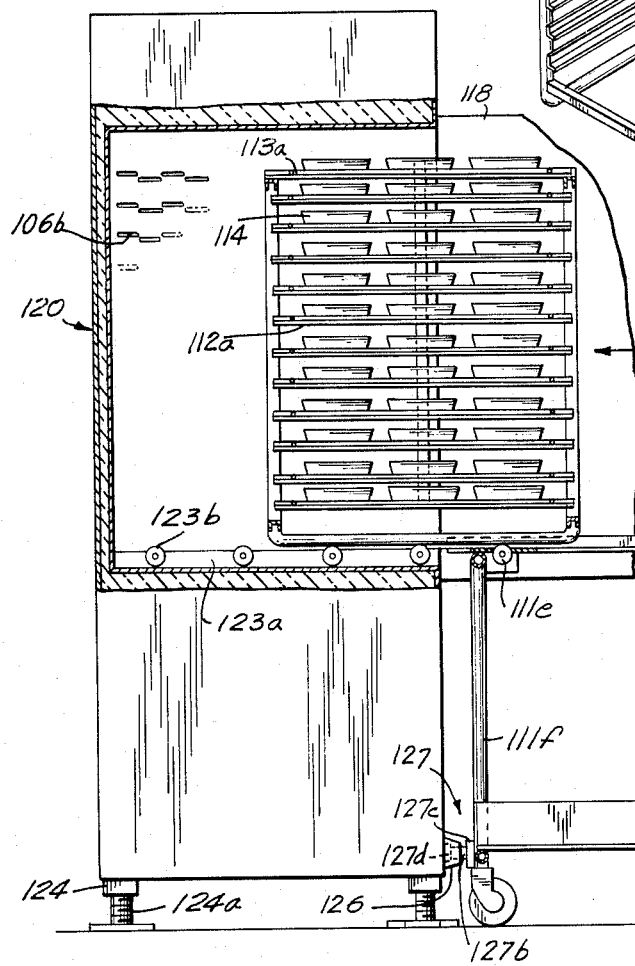
INVENTOR.
Sture Ingeman Nilsson
BY
his ATTORNEY

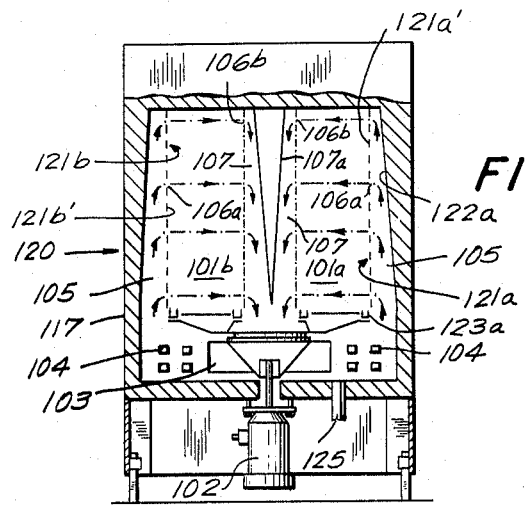
FIG. 7
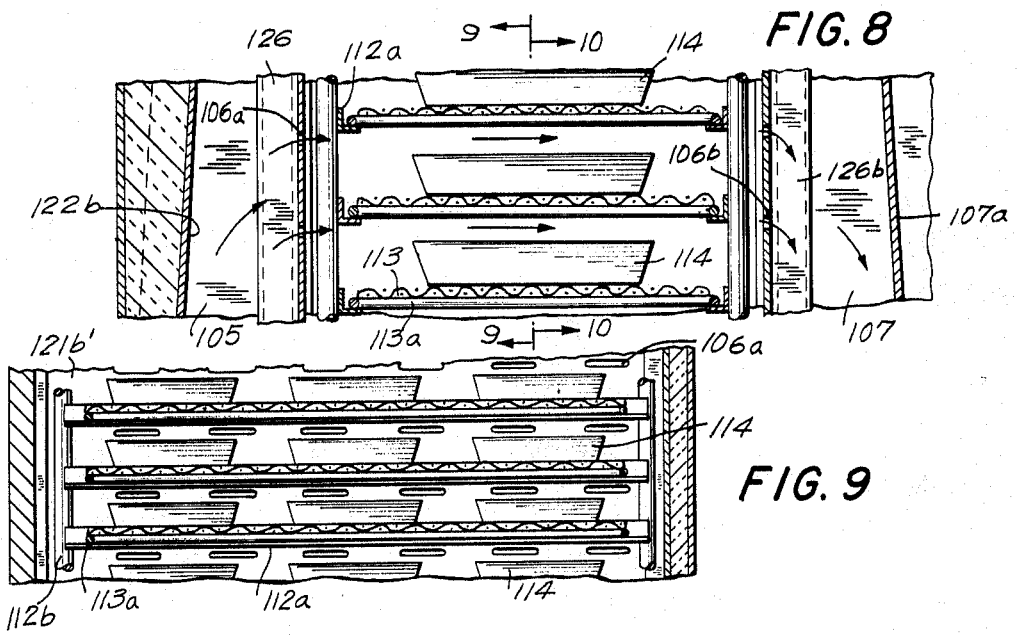
FIG. 8
FIG. 9
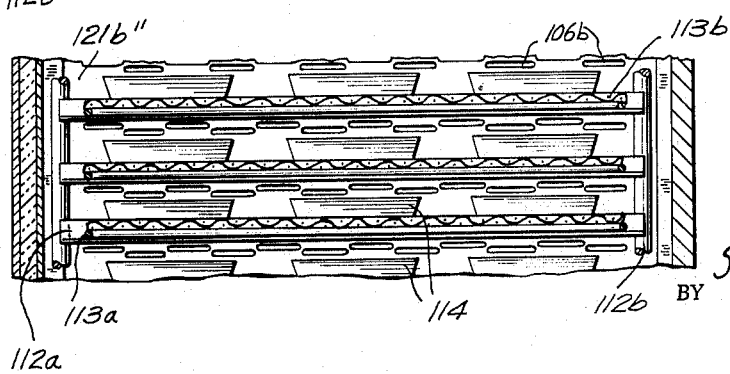
FIG. 10

UNITED STATES PATENT OFFICE 3,261,484
Patented July 19, 1966

3,261,484
STRUCTURE FOR HANDLING FOOD
Sture Ingemar Nilsson, Alingsas, Sweden, assignor to Aktiebolaget Electrolux, Stockholm, Sweden, a corporation of Sweden
Filed Feb. 21, 1964, Ser. No. 346,548
2 Claims. (Cl. 214—38)

This invention relates to structure for handling food and is especially concerned with structure for transferring into and from an upright heating space all at one time a plurality of receptacles containing food.

In schools, factories, industrial fairs and certain types of restaurants, for example, it is becoming more and more usual to serve precooked food which is heated in individual containers or dishes. Sometimes the food is deep-frozen which requires both thawing and heating in the container before it is served.

One difficulty in providing food service of this kind is obtaining approximately the same final temperature in all of the containers when a large number are heated at one time. Heretofore, the best solution has been to heat the containers in a warming oven which is kept at about the final temperature to which the food is to be heated. The disadvantage of this method is that the heating time is very long, because the desired temperature is reached only asymptotically. The time required for heating may be several hours, which often means that the method cannot, on the whole, be fitted into the necessary routine in a kitchen from which a large number of meals must be served in a relatively short time, as in a school, factory, or restaurant serving food to office workers, for example.

It has been found that frozen food packages can be thawed and heated in as short a time as twenty minutes, for example, without adversely affecting the food when the rate at which heat is supplied to the containers is suitably increased. Heating may be effected by air convection at a temperature considerably higher than the desired final temperature of the food or by radiation or by both air convection and radiation. With these heating methods it is important to discontinue heating at the right moment so that the food will not become too hot, and it is obvious that all of the containers must be evenly heated throughout the entire heating period if they are to be at the same temperature when the heating is terminated.

It already has been proposed to stack food receptacles or packages on vertically spaced apertured shelves mounted one above another on an upright frame. A mobile support or cart having tracks or guideways for one or more frames is employed to transport the receptacles from place to place. When the cart is moved closely adjacent to apparatus for heating food, frames loaded with a plurality of receptacles can be transferred all at one time into and from the heating apparatus, whereby all of the receptacles can be started and stopped heating at precisely the same time.

It is an object of this invention to provide improved structure of this kind for handling food which includes a cart and is especially useful with apparatus for rapidly heating to a definite elevated temperature food held in a plurality of receptacles, such as frozen food, for example, which are openly stacked one above another on a frame adapted to be carried on the cart and transferred therefrom into the heating apparatus and from the latter onto the cart. This is accomplished by providing spaced guide blocks at the front wall of the apparatus for heating food and elongated bumper means on the cart whereby the cart always will be accurately located in a frame transfer position when moved toward the heating apparatus to locate the elongated bumper means against the front wall of the apparatus between the spaced guide blocks.

Further objects and advantages of the invention will become apparent as the following description proceeds, and the various features of novelty which characterize the invention are pointed out with particularity in the claims annexed to and forming a part of this specification.

For a better understanding of the invention, reference may be had to the following description taken in connection with the accompanying drawing, in which:

FIG. 1 is a front elevation of food handling structure embodying the invention;

FIG. 2 is a top plan view of the food handling structure shown in FIG. 1 with the food frames removed therefrom and the front of a heating oven;

FIG. 3 is an end view of the food handling structure shown in FIG. 2;

FIG. 4 is a perspective view of the food frame shown in FIG. 1;

FIG. 5 is a perspective view of an apertured shelf for the food frames shown in FIGS. 1 and 4;

FIG. 6 is an end view of the heating oven shown in FIG. 2 and the food handling structure shown in FIGS. 1, 4 and 5 with the food handling structure adjacent to the heating oven;

FIG. 7 is a view diagrammatically illustrating the heating oven shown in FIG. 6;

FIG. 8 is a fragmentary vertical sectional view of the heating oven shown in FIG. 7 illustrating the food frame and shelf of FIGS. 4 and 5 in the heating oven shown in FIG. 7; and FIGS. 9 and 10 are vertical sectional views taken at lines 9—9 and 10—10, respectively, of FIG. 8.

Referring to the drawing, an oven with which the food handling structure of the invention is especially useful is shown in FIG. 7. The oven in FIG. 7 is provided with a hollow interior having insulated walls 117 within which are disposed casings 121a and 121b defining vertically extending heating spaces 101a and 101b, respectively, adapted to receive receptacles 114 containing food to be heated.

In FIG. 7 a motor 102 is arranged to drive a fan 103 for discharging air past heating elements 104. The heated air flows from the heating elements 104 into vertically extending air delivery channels 105. The outer walls of the heating spaces 101a and 101b are provided with slots 106a for dividing the heated air in the air delivery channels 105 into a plurality of streams which pass through the heating spaces 101a and 101b in substantially parallel paths of flow. The opposite inner side walls of the heating spaces are provided with slots 106b for discharging air exteriorly of the heating spaces.

The air discharged from the heating spaces 101a and 101b passes into vertically extending air discharge channels 107 in which air emerging from the slots 106b is collected. The air discharge channels 107, which are formed by a V-shaped member 107a disposed between the inner side walls of the casings 121a and 121b, provide downward paths of flow for air. The air collected in the air discharge channels 107 flows downward therein to the inlet of the fan 103 from which air is discharged past the heating elements.

In FIG. 7 the air delivery channels 105 are formed by the outer side walls of the casings 121a and 121b, which are vertical and erect, and walls 122a and 122b spaced therefrom which are inclined from the vertical and slope inward toward the right-hand side wall of the casing 121a and left-hand side wall of the casing 121b, respectively.

The heating oven 120 illustrated in FIG. 7 is especially suitable for rapidly heating at one time food held in a large number of receptacles. In order to insert a large number of the receptacles into the oven all at one time and also to remove them from the oven all at one time, food handling structure like that shown in FIGS. 1, 2 and 3 may be employed. The food handling structure comprises a rectangular-shaped cart 111 having parallel sides extending lengthwise of the cart and parallel ends transverse to the sides and bridging the latter, the cart being movable on swiveled caster wheels 111a with the aid of a handle 111b and provided with two pairs of L-shaped members or second guideways 111c extending transversely of the cart in side-by-side relation. As seen in FIGS. 2 and 6, the L-shaped members 111c may be provided with rollers 111e mounted for rotation thereon.

Each pair of L-shaped members 111c serves as a support for a frame 112 shown in FIGS. 1, 4 and 6 and like the vertically extending frames shown in FIG. 1. Each frame 112 comprises spaced U-shaped side members 112b which are connected by end cross members 112c and the bottoms of which serve as skids. Each side member 112b is provided with L-shaped rails 112a which are vertically spaced one above another and serve to support apertured shelves 113. Each shelf 113 comprises a frame 113a of rectangular form and wire mesh or screening 113b secured thereto, as best shown in FIGS. 5 and 6.

After the receptacles 114 are positioned on the shelves 113 and the frames 112 are loaded to provide three vertical stacks of the receptacles on each frame, the door structure 118 of the oven 120 may be opened and a first side or front of the cart 111 moved in front of the heating spaces 101a and 101b, as shown in FIG. 6. The L-shaped members 111c desirably are aligned with spaced tracks or first guideways 123a in the bottom end walls of the heating spaces 101a and 101b, one of the rails 123a being best shown in FIG. 6. Stated another way, the tracks or rails 123a form guideways at surfaces at the vicinities of the bottom walls of the vertically extending heating spaces 101a and 101b.

Rollers 123b may be mounted on the rails 123a for rotation thereon to facilitate transfer of the frames 112 from the cart 111 into the heating spaces 101a and 101b and from the latter back to the cart 111. As shown in FIG. 6, the oven 120 may be provided with legs 124 which are vertically adjustable at 124a to adjust the oven vertically with respect to the cart 111, so that the rails 111c on the cart and the rails 123a in the bottom walls of the heating spaces will be at the same height. After the frames 112 are pushed into the heating spaces 101a and 101b, the cart 111 can be moved from the front wall of the oven 120 and the door structure 118 closed, and heating of all the receptacles 114 in the vertically extending heating spaces or heating zones 101a and 101b will commence at the same time.

As shown in FIG. 9, the slots 106a at the outer air inlet sides 121a' and 121b' of the heating spaces 101a and 101b, respectively, are formed in horizontal rows which are vertically spaced from one another. As shown in FIG. 10, the slots 106b at the inner air outlet sides 121a'' and 121b'' of the heating spaces 101a and 101b, respectively, also are formed in horizontal rows which are vertically spaced from one another.

The receptacles 114 are stacked in the frames 112 so that the divided air streams introduced through the slots 106a are directed primarily over the tops of the receptacles 114 on one of the shelves 113 in the stacks and below the receptacles on the next higher shelf 113 in the stacks, as illustrated in FIGS. 8, 9 and 10. The height of the receptacles 114 is at least half of the vertical distance between adjacent apertured shelves 113, whereby the gaps between the receptacles 114 in the several stacks are relatively narrow and will promote the sweeping effect of the divided heated air streams flowing past the receptacles and heat transfer to the food in the receptacles 114 by air convection. Hence, the receptacles 114 are supported on the shelves 113 in such manner that the receptacles offer minimum resistance to flow of heated air in the heating spaces. As best shown in FIG. 10, the slots 106b at the air outlet sides of the heating spaces 101a and 101b also are vertically disposed with respect to the shelves 113 and receptacles 114 to promote discharge of the air streams flowing over the tops and bottoms, respectively, of the receptacles in the several stacks.

In order to remove fumes and moisture which is produced when the food is heated and is taken up by the heated air, the oven 120 in FIG. 7 is provided with a vent, as indicated at 125, whereby the circuits for circulation of heating air in the oven 120 will operate substantially at atmospheric pressure.

After the food in the receptacles 114 has been heated a sufficient length of time and the food in all of them is heated to the definite elevated temperature, the door structure 118 can be opened and the cart 111 moved in front of the oven. The frames 112 can be moved forward from the heating spaces 101a and 101b and onto the tracks or rails 111c of the cart 111, and the cart can then be moved from the front wall of the heating oven 120.

In accord with this invention, the front wall of the heating oven 120 is provided with spaced guide blocks 126 which coact with elongated bumper means 127 on the cart 111 to locate the latter in a frame transfer position when the cart is moved closely adjacent to the oven. The guide blocks 126 are spaced from one another at the front of the oven and formed of resilient material like rubber, for example. As best shown in FIG. 2, the guide blocks 126 are square in vertical section, the inner sides thereof sloping and diverging from one another in a forward direction from the front wall of the oven.

The bumpers 127, which are spaced apart at the first side or front of the cart 111, include U-shaped members 127a fixed to brackets 127b which in turn are fixed to and project forward from an elongated bar 127c extending lengthwise of the cart at the first side or front thereof and fixed at its ends to upright legs 111f of the cart. The bumpers 127 are spaced apart at the front of the cart 111 so that the distance between the outer ends of the bumpers, as indicated at 127d, is slightly less than the distance between the inner outwardly flaring sides or faces of the resilient guide blocks 126. As best seen in FIG. 6, the elongated bumper means formed by the bumper members 127a projects forward from the front or first side of the cart 111 and in transverse section is in a vertical plane which is substantially parallel to the front vertical wall of the oven 120 when the cart is in its frame transfer position at the front wall of the oven.

When the cart 111 is moved in front of the oven 120 with the bumpers 127 bearing against the front wall of the oven and snugly positioned between the resilient guide blocks 126, as shown in FIGS. 2 and 6, the L-shaped members or second guideways 111c are aligned with the spaced tracks or first guideways 123a in the bottom end walls of the heating spaces 101a and 101b. The cart 111 in this position is in a frame transfer position with the L-shaped members 111c and oven rails 123a substantially at the same vertical height and with the abutting ends of the members 111c and rails 123a closely adjacent to one another, as shown in FIG. 6. With the cart 111 in the frame transfer position just described, the frames 112 can be manually moved horizontally and transferred from the rails 123a in the bottom walls of the heating spaces 101a and 101b onto the L-shaped members 111c on the cart 111 and from the cart 111 into the heating spaces 101a and 101b.

As shown in FIGS. 1 and 3, the handle 111b extends upward and laterally from the second side of the cart 111 at a zone intermediate its ends. The handle 111b is of U-shape, the closed end of the U forming a horizontal hand grip 111b' which can be readily grasped to move the cart, and the spaced arms 111b'' of the U being inclined to the vertical and sloping forward and downward from the hand grip to a longitudinal member 111g at the rear or second side of the cart to which the lower ends of the arms are fixed.

In FIG. 1 it will be seen that each spaced arm 111b" of the handle 111b is located between a different pair of spaced L-shaped members 111c. Hence, each inclined arm 111b" of the handle 111b is in the path of movement of one of the frames 112 and serves as a stop to limit rearward movement of one of the frames on the second guideway or L-shaped rails 111c when it is transferred onto the care 111 from one of the heating spaces of the oven 120.

Modifications of the embodiment of the invention which has been described and illustrated will occur to those skilled in the art, so that it is desired not to be limited to the particular arrangement set forth. Therefore, it is intended in the claims to cover all those modifications and features which do not depart from the spirit and scope of the invention. However, subject matter shown in FIGS. 7 to 10 and described herein which is common to this application and to copending application Serial No. 346,549, filed February 21, 1964, and not being claimed herein is being claimed in application Serial No. 346,549.

What is claimed is:

1. The combination with apparatus of the class described for keeping food held in receptacles, the apparatus comprising a casing having an outer shell including a front vertical wall and a pair of side-by-side vertically extending interior spaces, each of the interior spaces being defined by opposing side walls, a back wall, and top and bottom walls and having an access opening at the front vertical wall of the outer shell, and closure means for the access openings movable between closed and open positions, each space having a first surface at the vicinity of the bottom wall thereof, of structure for handling food comprising first and second means for stacking a plurality of receptacles one above another in vertically spaced relation, each of the first and second stacking means comprising a vertically extending frame, a plurality of shelves, and means on the frame for carrying the shelves one above another in vertically spaced relation and upon which the receptacles are adapted to be supported, a first guideway at the first surface of each of the spaces for supporting a different one of the frames and on which the frame supported thereby is movable, a movable rectangular-shaped wheeled cart, the cart having substantially parallel sides extending lengthwise of the cart and ends transverse to the sides and bridging the latter, a pair of second guideways in side-by-side relation on the cart for supporting the frames at substantially the same vertical height as the first guideways, the frames being movable transversely of the cart on the second guideways, each of the second guideways being normal to the sides of the cart and extending from a first side to the opposite second side thereof whereby, when the cart is wheeled to a frame transfer position at the front vertical wall of the outer shell with the closure means open to afford access to the interior spaces, one end of each of the second guideways at the first side of the cart is closely adjacent to and in alignment with a different one of the first guideways and the first and second guideways of each aligned pair of guideways are at approximately the same vertical height to enable the frames to be manually moved horizontally and transferred from each of the second guideways onto the first guideway in alignment therewith and in one of the spaces and from the spaces onto the second guideways, a pair of spaced guide blocks fixed to the front of the outer shell below the closure means, the guide blocks projecting forward from the front of the outer shell at the same height, at least the outer exposed surfaces of the guide blocks being formed of resilient material, the inner walls of the guide blocks which face one another being vertical and diverging from regions at the front wall to their outer ends removed from the front wall, the wheeled cart having bumper means extending lengthwise thereof at the first side thereof, the bumper means being spaced from the first side of the cart and in transverse section being in a vertical plane which is substantially parallel to the front vertical wall when the cart is in its frame transfer position at the front wall of the outer shell, and the bumper means being horizontally disposed on the cart at the same height as the blocks and with the extreme outer ends thereof spaced apart substantially the same distance as the inner walls of the blocks at the regions thereof at the front wall.

2. Structure for handling food as set forth in claim 1 in which each of the first and second guideways comprises a pair of spaced tracks, and a U-shaped handle having a closed end and spaced arms which extend therefrom alongside one another, the handle projecting from the cart at the second side thereof with its closed end substantially parallel to the first and second sides of the cart and laterally offset therefrom and at a height above the second guideways, and the spaced arms being inclined downward from the closed end of the handle at an acute angle to the horizontal with the outer end of each arm fixed to the second side of the cart at a region intersected by a vertical plane passing between the spaced tracks of a different one of the second guideways, each of the arms being in the path of movement of one of the frames movable on a different one of the second guideways to stop movement of the frames on the second guideways when the frames are moved onto the cart from the first guideways in the spaces.

References Cited by the Examiner
UNITED STATES PATENTS

| | | | |
|---|---|---|---|
| 2,019,949 | 11/1935 | Brace | 218—38.24 X |
| 2,545,696 | 3/1951 | Harvuot | 214—38.24 |
| 2,883,253 | 4/1959 | Litman | 214—38.8 X |
| 3,021,795 | 2/1962 | Hayba et al. | 214—38.24 X |

FREDERICK L. MATTESON, Jr., *Primary Examiner.*

E. G. FAVORS, *Assistant Examiner.*